United States Patent [19]

Turner

[11] 4,010,882
[45] Mar. 8, 1977

[54] SPROCKET DRIVE AND STRIPPER ARRANGEMENT FOR COMPUTER FORM FEEDER APPARATUS

[75] Inventor: Carl L. Turner, Mount Prospect, Ill.

[73] Assignee: A. B. Dick Company, Chicago, Ill.

[22] Filed: May 15, 1975

[21] Appl. No.: 577,705

[52] U.S. Cl. .................................. 226/11; 226/75; 226/78
[51] Int. Cl.² .................. B65H 25/04; B65H 17/40
[58] Field of Search .................. 226/74, 75, 78, 79, 226/80, 83, 86, 87, 11, 44; 355/75

[56] References Cited

UNITED STATES PATENTS

| | | | |
|---|---|---|---|
| 2,006,702 | 7/1935 | Van Buren | 226/74 |
| 3,446,554 | 5/1969 | Hitchcock et al. | 355/75 |
| 3,490,668 | 1/1970 | Dean et al. | 226/74 |
| 3,611,481 | 10/1971 | Malosh et al. | 226/74 X |
| 3,687,347 | 8/1972 | Rod et al. | 226/74 |
| 3,734,617 | 5/1973 | Kitch | 226/11 X |
| 3,908,883 | 9/1975 | Bellisai et al. | 226/74 |

*Primary Examiner*—Johnny D. Cherry
*Assistant Examiner*—Bruce H. Stoner, Jr.
*Attorney, Agent, or Firm*—Ronald J. LaPorte; Peter S. Lucyshyn

[57] ABSTRACT

A sprocket drive device for a computer form feeder for transporting a computer printout web having predeterminedly spaced apertures along the edges thereof along the upper and lower surfaces and about a free end of a copyboard overlying the copy platen of a copying machine, including a pin chain assembly mounted on spaced driven sprocket and idler wheels. The pin chain assembly includes a plurality of predeterminedly spaced pins extending therefrom for receipt in the spaced apertures of the web. The pins travel along an endless path between the wheels spaced from the upper and lower surfaces of the copyboard, respectively. A guide and stripper member is provided on the sprocket drive for guiding the web from the pins to the copyboard surface and vice-versa while avoiding the tearing of the web material about the apertures. The guide and stripper member includes upper and lower central portions extending between the wheels for guiding the web along upper and lower planes passing through the base of the pins. End guide portions are provided which are inclined predeterminedly between the central portions and a corresponding copyboard surface spaced from said central portion to lift the web off the pins as the web is moved from the sprocket device to the copyboard and to guide the web onto the pins as the web is moved from a copyboard surface to the sprocket device. A roller is provided at the free end of the copyboard about which the web passes is mounted for movement toward and away from the end of the copyboard. Switch actuator means engaged by the roller as it is moved toward the free end of the copyboard due to the slackening in the web engages the armature of the switch mounted adjacent thereto in response to the movement of the roller toward the free end of the copyboard.

6 Claims, 6 Drawing Figures

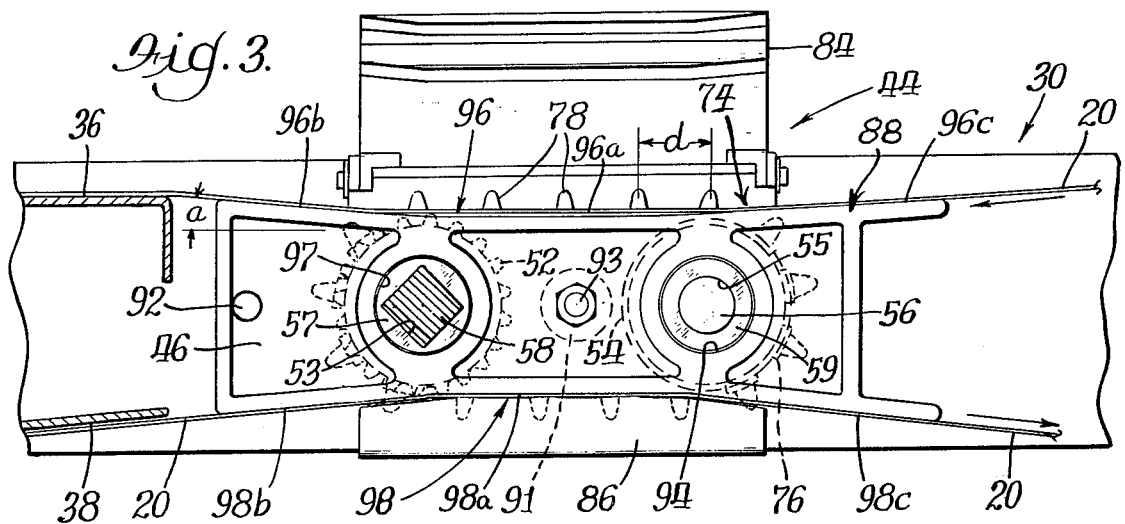
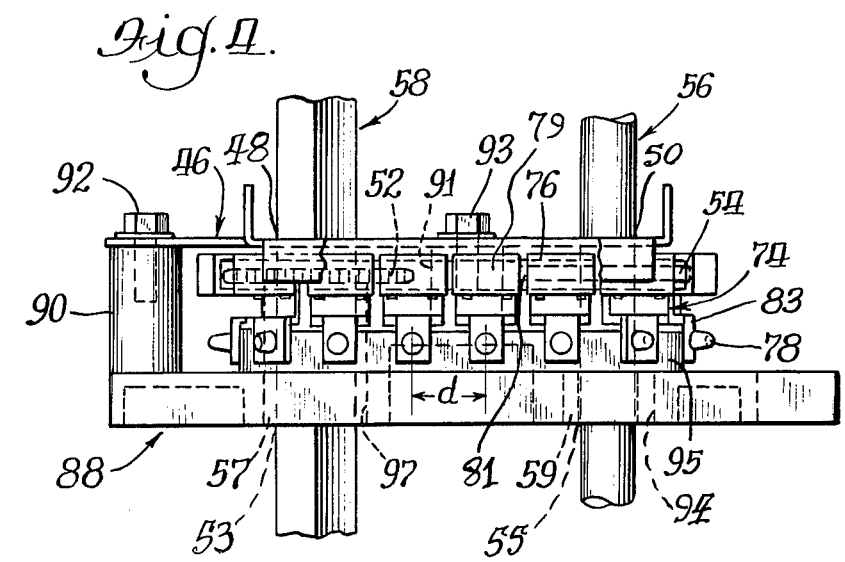
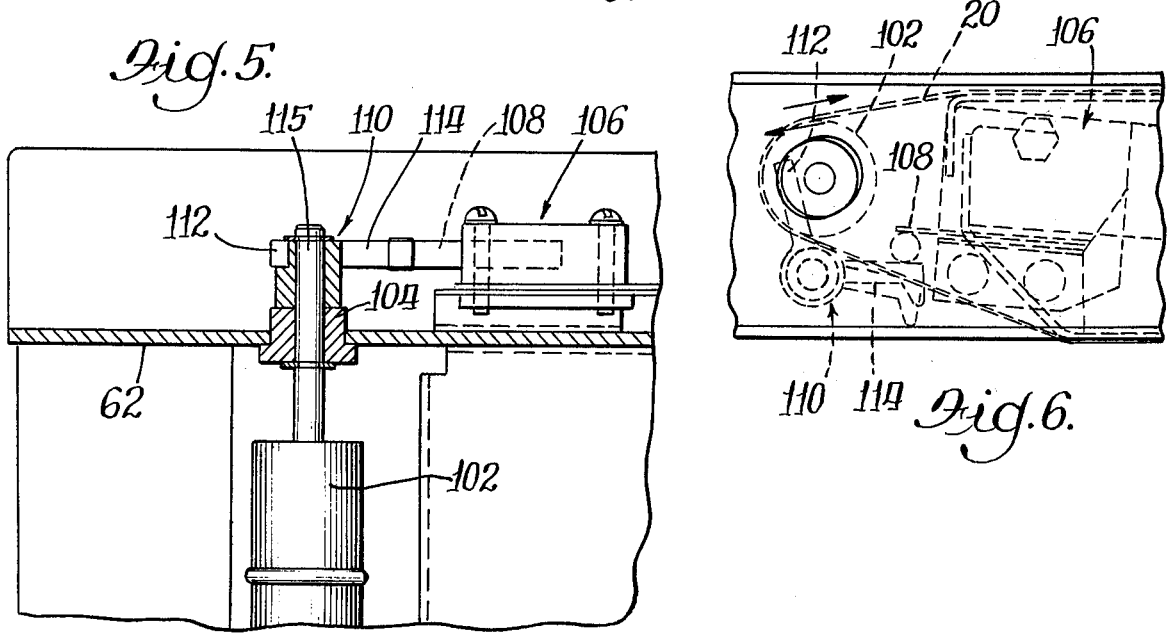

SPROCKET DRIVE AND STRIPPER ARRANGEMENT FOR COMPUTER FORM FEEDER APPARATUS

BACKGROUND OF THE INVENTION

This invention relates generally to segmented web feeder apparatus and more particularly to a chain drive or sprocket feed assembly for feeding computer printout form webs over a copyboard to the original document platen of a copying machine.

With the widespread use of computers for storing and retrieving information, the need for inexpensive copies of computer printout webs has increased. To produce such copies, electrostatic and the like copiers are being employed.

Because manually feeding the web, segment by segment to the original document platen of a copier would be time consuming and difficult, apparatus for carrying out the latter on an automatic basis has been provided. One such computer form feed apparatus for use in conjunction with a copying machine for feeding computer printout webs to the original document platen thereof includes first and second feed trays between which a conventional fan fold or segmented web computer printout form is fed. The web passes from the first tray through a chute and then along the upper and lower surfaces of a copyboard overlying the platen. The web passes through a second chute to the second tray located beneath the first tray. A pair of sprocket or chain drive devices provide the direct driving force for the web on the copyboard. The chain drive devices each include an endless chain having a plurality of pins extending outwardly therefrom. The pins are spaced a predetermined distance from each other to match the spacing of apertures provided along the edges of the computer form web. The chain is mounted on spaced sprocket and idler wheels and is driven thereabout by rotation of the sprocket wheel. A drive mechanism coupled to the sprocket wheel drives the chain along its path.

A more detailed description of the chute arrangement and drive mechanism employed in the computer form feed apparatus described can be obtained from co-pending U.S. patent applications Ser. Nos. 577,704 and 577,703 entitled Improved Guide Chute Arrangement for Web Feeding Apparatus and Drive Mechanism for Computer Form Feeder Apparatus, respectively, filed the same date as the subject application and assigned to the same assignee.

In the computer form feed apparatus described heretofore, it was found that in transporting standard computer form webs along the copyboard by insertion of the moving pins of the chain drive into the spaced apertures provided along the edges of the web, the web tended to follow the pins even as the left the horizontal path to be carried about the peripheries of the sprocket and idler wheels. Because the pins extend angularly from the chain as the pins are carried about the sprocket or idler wheels, the distance between the free ends of the pins increases. As such, a tearing of the web adjacent the apertures often occurs. Once the web is torn, it is difficult to feed properly thereafter and as such, alignment of the web segments on the copy platen likewise becomes difficult.

SUMMARY OF THE INVENTION

Accordingly, it is an object of the present invention to provide a new and improved chain drive or sprocket device for use in a computer form feed apparatus of the above-described type which avoids the drawbacks attributed to the prior art chain drive or sprocket devices discussed.

It is another object of the present invention to provide a sprocket or chain drive device of the last-mentioned type which is simple in construction, yet avoids tearing of the computer form feed web as it is fed by the pins of the device along a horizontal surface such as a copyboard.

It is still another object of the present invention to provide a sprocket or chain drive device of the last-mentioned type which is relatively inexpensive to fabricate.

Briefly, a sprocket or chain drive device according to the invention comprises a sprocket wheel and an idler wheel spaced from each other along a horizontal plane at the side of the copyboard. The sprocket wheel is driven by a rotatable shaft. An endless chain having a plurality of pins extending outwardly therefrom is positioned about the peripheries of the sprocket and idler wheels. Upper and lower pivotally mounted members are provided to hold a web carried by the pins extending through apertures therein securely thereon. Upper and lower guide or stripper members are provided on the device adjacent the chain. Each guide member extends substantially horizontally along the horizontal path of the pins between the idler and sprocket wheels and at a location where the pins begin to leave the horizontal path to be carried about one of the wheels, is inclined upwardly away from a respective wheel at an angle of about 3° to 10°. With such guides, as the pins begin to leave the horizontal path, the web, which would normally tend to follow, is stripped away from the pins. Likewise in the case wherein the web is being moved toward a sprocket drive device from a copyboard, the web is guided by the guide member from the copyboard onto the pins. Thus, the tearing of the web is avoided.

DESCRIPTION OF THE DRAWINGS

In the drawings:

FIG. 3 is an enlarged side view of a preferred embodiment of the chain or sprocket drive device of FIGS. 1 and 2 according to the invention;

FIG. 4 is a partially cut-away top view of the sprocket drive device of FIG. 3;

FIG. 5 is a partially sectioned top view of a switch mechanism incorporated into the copyboard used in indicating that the computer web has been removed at least partially from the drive device or has slackened due to other causes; and FIG. 6 is an enlarged side view of the switch mechanism of FIG. 5.

DETAILED DESCRIPTION OF THE DRAWINGS

Figure 1:
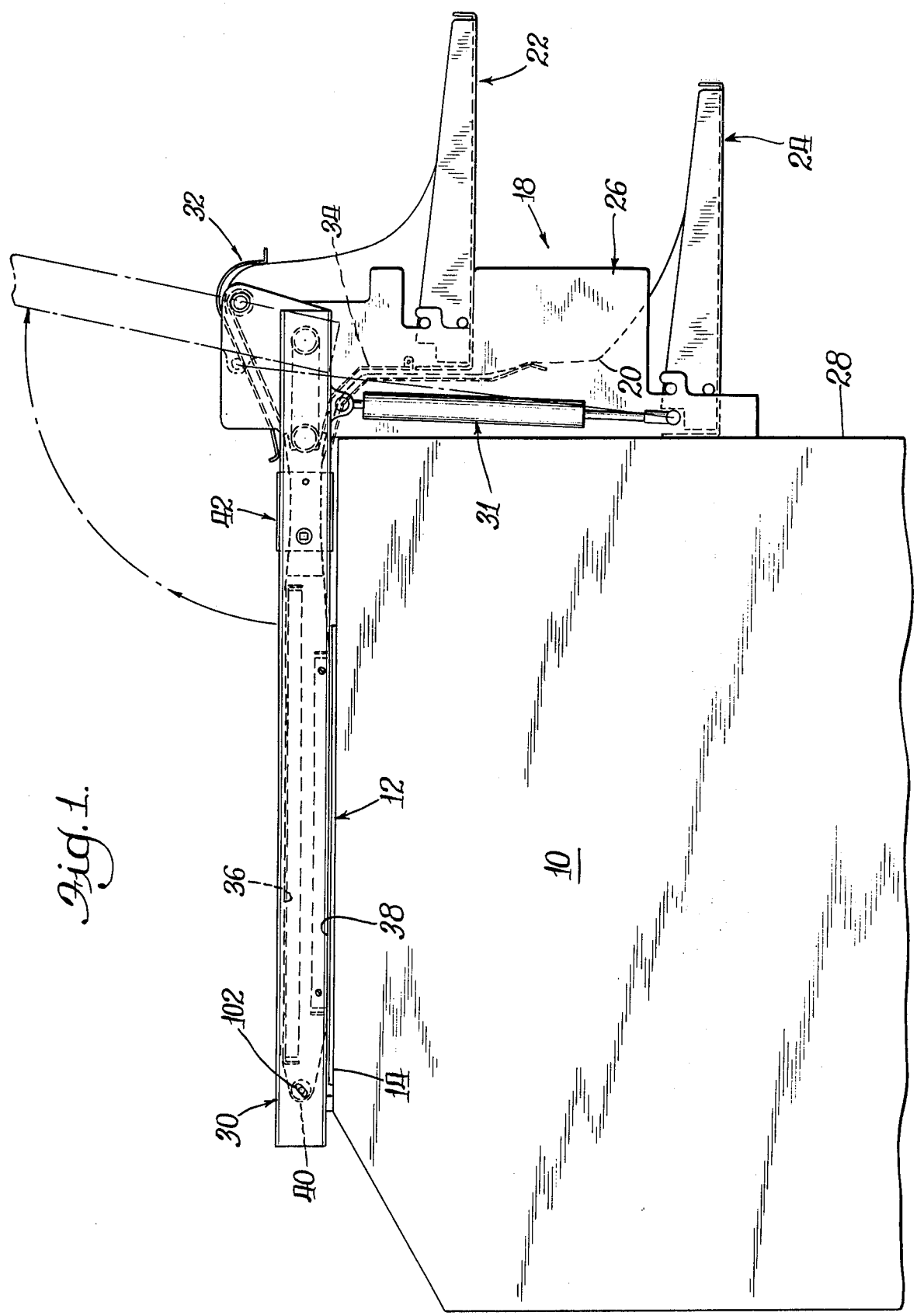
FIG. 1 is a side view of a copying machine having a computer form feed apparatus mounted thereon for conveying computer printout webs to the original document platen of the machine for copying, which has a copyboard including a pair of chain or sprocket drive devices according to the invention for transporting the computer web therealong.

Referring now to the drawings in greater detail wherein like numerals have been used throughout the various views to designate similar components, there is shown in FIG. 1 a copying machine designated by the numeral 10. The copying machine shown is of the electrostatic or xerographic type, but can take any form so long as it produces copies on a recording medium such as paper, microfilm or the like. The copying machine includes a transparent platen 12 located along the upper wall 14 thereof on which original documents and materials to be copied are placed. Conventional copying instrumentalities (not shown) carry out the copying process and are included within the outer housing 16 of the machine.

A computer form feed apparatus designated generally by the numeral 18, is mounted on the copying machine for conveying a computer printout web 20 between supply trays 22, 24 to the original document platen 12. The computer form feed apparatus includes a main frame 26 which is mounted on suitable fasteners (not shown) extending from the front wall 28 of the copying machine. A copyboard 30 is supported on the frame 26. The copyboard overlies the platen 12 and carries the computer form printout web 20 to the platen for copying. The copyboard is pivotal between an operative position overlying platen 12 and an inoperative, raised position shown in dotted lines. When in the latter position, "threading" of the computer form web 20 about the copyboard is made easier. A pair of gas springs, only one, 31, of which is shown, coupled to the copyboard and to the main frame 26, is provided to assist the raising of the copyboard to the last-mentioned position.

Figure 2:
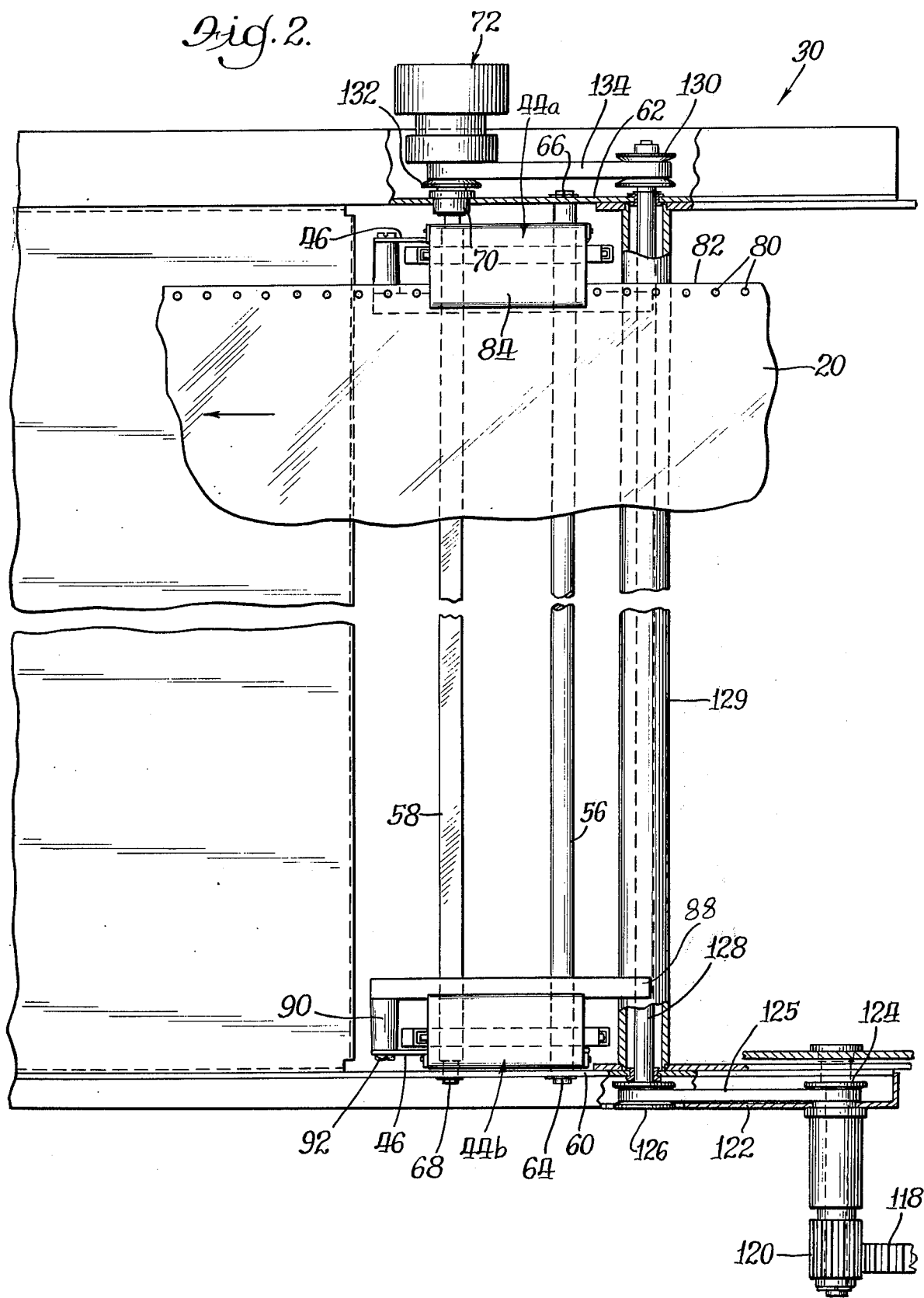
FIG. 2 is a partially sectioned, enlarged top view of the copyboard of FIG. 1 illustrating the chain or sprocket drive devices according to the invention.

The computer form web 20 is transported between trays 22 and 24 in either direction, through one or the other of guide chutes 32 and 34 which are spaced predeterminedly from respective trays 22, 24 to facilitate proper stacking of the web in the trays, depending upon the direction of movement of the web and over the upper and lower surfaces 36, 38 of the copyboard 30 and around a roller 102 located at the free end 40 thereof. The direct driving force applied to the computer printout web 20 is provided by a pair of sprocket or chain-drive devices 44a, 44b seen in FIG. 2. Each chain-drive device as illustrated in FIGS. 3 and 4, includes a frame 46 (see FIGS. 3 and 4) having a pair of spaced apertures 48, 50 extending therethrough.

A sprocket wheel 52 having a polygonal (herein square) shaped central aperture 53 (FIG. 3) is placed with the aperture in alignment with aperture 48 of the frame 46. The wheel includes a hub portion 57 extending therefrom. An idler wheel 54 having a circular shaped central aperture 55 (FIG. 3) is placed with the aperture in alignment with aperture 50 in the frame. The idler wheel also has a hub portion 59 extending therefrom. The diameters of the wheels are both smaller than the distance between the upper and lower surfaces 36, 38 of the copyboard.

A first shaft 56 having a circular cross-section (See FIG. 2) is received in the central aperture 55 of the idler wheel. The shaft 56 extends between opposing side walls 60, 62 (See FIG. 2) of the copyboard 30 and the idler wheel is rotatable thereabout. The shaft is fastened onto the respective walls by suitable fasteners 64, 66 extending through the corresponding walls and received in opposite ends of the shaft.

A second shaft 58 having a polygonal (herein square) cross-sectional shape is received in the aperture 48 of frame 46 and the central aperture 53 of the sprocket wheel 52. The shaft is rotatably driven to drive sprocket wheel rotatably therewith. The shaft 58 is fastened to wall 60 by a suitable fastener 68 extending therethrough and into the end of the shaft. The opposite end of the shaft 58 passes through wall 62 into a bearing member 70 mounted thereon. The shaft ends in a manually operated clutch arrangement 72 which is used to align segments of the computer form web 20 over the copying machine platen 12 prior to operating the computer form feed apparatus. The sprocket devices 44a, 44b are slideable along shafts 56, 58 toward and away from each other (See FIG. 2) to accommodate webs of different widths.

Mounted about the peripheries of the sprocket and idler wheels 52, 54 is a pin chain assembly 74 which includes an endless chain 76 having extending outwardly therefrom, a plurality of pins such as 78 which are predeterminedly spaced from each other as shown in FIGS. 3 and 4; i.e. a distance $d$.

The pins are molded integrally with links 79 of the chain. Links 79 are coupled by suitable means to intermediate links 81 herein fabricated from metal. The pins 78 are supported on extensions 83 of the links which protrude outwardly toward the side of the chain assembly opposite from frame 46. The pins 78 are of a given diameter, predeterminedly smaller than the apertures 80 (See FIG. 2) provided along the opposite side edges, such as 82, of the computer form web 20.

Also mounted on frame 46 are upper and lower hinged covers 84, 86 (See FIG. 3). The covers are spring-loaded with snap-over springs (not shown) to insure the positioning thereof in either an open or closed position with respect to pins 78.

Attached to the frame 46 by suitable fasteners is a guide or stripper member 88. A preferred embodiment of the stripper member is fabricated of one-piece molded plastic having a pair of integral spacers 90, 91 extending from the side thereof outwardly to mount the stripper on frame 46 in spaced relation with respect thereto. Screws 92, 93 extending through frame 46 are received in the ends of the spacers 90, 91, respectively, to secure the stripper member to the frame.

As can be seen in FIGS. 3 and 4, stripper member 88 has a pair of spaced apertures 94, 97 for receiving hubs 59, 57 of sprocket and idler wheels 52, 54, respectively. The stripper member includes a track portion 95 over which the pin support extensions 83 pass to ensure that the pins are maintained on the same plane as they travel between the wheels. The stripper member also includes upper and lower guide surfaces 96, 98 along which the computer form web 20 passes. The central portions 96a, 98a of the guide surfaces, respectively, extend between the sprocket and idler wheels along a plane substantially parallel to the upper and lower wall portions 36, 38 of the copyboard but spaced slightly from such walls in the direction of shafts 56, 58. Guide surface extension portions 96b, 96c and 98b, 98c, respectively, formed integrally with the central portions 96a, 98a, respectively, of the stripper members, extend beyond the free ends of the drive device and are inclined slightly towards the upper and lower wall surfaces of the copyboard, respectively, at an angle somewhere between 3° and 10°. The last-mentioned angle, it has been found, depends upon the relationship of the diameter of the pins 78 to the diameters of the apertures 80 in the computer form web 20. It has been estimated that if the pin diameters are about 10% smaller in diameter than the diameters of the holes in the web, the angle $a$ (See FIG. 3) of incline of the end portions of the guide surfaces 96, 98 is approximately 8°. For a pin diameter approximately 15% smaller than the hole diameter, an angle of approximately 5° is required. The provision of the guide stripper member prevents a web from being torn due to the tendency thereof to follow the pins 78 along their path. To explain, as the pins move along the path between the idler and sprocket wheels, the distance therebetween remains substantially constant; i.e. $d$. However, as the pins are carried on chain 76 about the periphery of the sprocket or idler wheels, the pins become angled with respect to each other thereby increasing the distance between the extended free ends of the pins. With the pins separated as described, the web 20 has a tendency to be held thereon, and as such the web is often torn around the holes as it is carried forward about the idler or sprocket wheels. Once a web is torn as described, it is difficult to feed it properly thereafter.

One way of preventing the latter from occurring would be to enlarge the holes in the web or reduce the diameter of the pins to an extent where tearing would not occur. However, in such a case too much play between the pins and web would present an alignment problem of the web segments on the copy platen 12. Thus, to overcome the last-mentioned tearing of the web while still maintaining alignment of the web with respect to the copy platen, stripper member 88 has been provided. As can be seen in FIG. 3 of the drawings, the extension portions 96a, 96b, and 98a, 98b thereof begin to incline in the direction of the free end of the pins 78 as the pins begin to be moved about the sprocket and idler wheels so that the web 20 moving from the sprocket device to the copyboard is effectively lifted or striped from the pins and carried away therefrom before the pins can tear the web. Likewise, the member 88 guides a web onto the pins in the case wherein the web is moved from the copyboard to the sprocket device.

The actual driving of the sprocket drive devices 44a, 44b is produced by a drive mechanism (not shown) described in co-pending U.S. patent applications Ser. No. 577,703 entitled Drive Mechanism for Computer Form Feeder Apparatus and filed May 15, 1975 and assigned to the same assignee as the instant invention. The drive mechanism drives a gear 118 (See FIG. 2) which is in meshing engagement with the pinion 120 extending from the side wall 60 of the copyboard and through the housing wall 122 thereof. A pulley member 124 is mounted on the pinion and an endless belt 125 encircles the pulley and a second pulley 126 mounted on the end of a rotatable shaft 128 located adjacent shaft 56 of the sprocket drive device between walls 60, 62 of the copyboard. The shaft 128 is mounted in an outer housing 129 extending between walls 60, 62. A second pulley 130 provided at the opposite end of the shaft 128 is coupled to pulley 132 mounted on the end of drive shaft 58 by endless belt 134. Thus, upon rotation of pinion 120, shaft 128 is rotated to impart rotation to the sprocket drive shaft 58 which thereby transports the web 20 along the copyboard.

Turning now to FIGS. 5 and 6 of the drawings, there is shown therein the end roller 102 about which the web is looped at the free end of the copyboard to change the direction of movement of the web between the upper and lower surfaces of the copyboard. The roller is mounted between wall 60, 62 of the copyboard frame and is journaled in bearings such as 104 mounted on wall 62. The bearings, such as 104, are mounted, however, for lateral movement in the direction of the arrows in respective wall 60, 62 so that the roller is movable toward and away from the free end of the copyboard. (See FIG. 6). When the web 20 is held both by the upper and lower moving pins 78 of the drive devices 44a, 44b, the end roller 102 is moved away from the free end of the copyboard. When the web is released from at least one of the upper and lower moving pins 78 of the devices, the roller is released and moves, due to gravity, to its position nearer the free end of the copyboard. The roller may be released also in the event the web becomes torn or too much slack is present in the web.

To make an operator aware of the last-mentioned occurrence, a microswitch device 106 has been placed adjacent the roller 102 with the armature 108 thereof extending toward the roller. A pivotally mounted switch actuator 110 is positioned below the roller and includes a pair of outwardly extending arms 112, 114. Arm 112 is positioned adjacent the end of the shaft 115 on which the roller 102 is mounted. The other arm is positioned adjacent armature 108 of the switching device. Thus, when the web is slackened for one reason or another to permit roller 102 to be moved against arm 112, the actuator 110 is pivoted, moving arm 114 thereof into engagement with the armature 108. The latter causes the switch to be operated. The operation of the switch actuates circuitry (not shown) which interrupts the operation of the feeder and/or indicates through visual or audible means (not shown) to the operator that the above has occurred. The last-described circuitry and alarm means can take many forms and will be obvious to one skilled in the art. Once the situation is rectified, the roller is moved back to its original position permitting actuator 110 to return the arms 112, 114 to a position whereat switch 106 is unoperated.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What I claim is:

1. In a computer form feed apparatus for feeding a web having predeterminedly spaced apertures along an edge thereof along a copyboard having upper and lower surfaces and a free end, said web moving over said upper surface about the free end of said copyboard and along said lower surface, the upper and lower surfaces of said copyboard being predeterminedly spaced from each other, sprocket drive device means mounted on said copyboard for transporting said web, including in combination;

first and second spaced wheels having diameters less than the distance between said copyboard surfaces and one of which includes a sprocket wheel having a plurality of projections extending radially outwardly about the periphery thereof, endless pin chain means encircling said wheels for movement between said wheels and about the peripheries thereof, said pin chain means including a plurality of pins extending therefrom, said pins being of a predetermined diameter and spaced predeterminedly from each other for receipt in the spaced apertures in said web, means coupled to said sprocket wheel for driving the latter rotatably thereby to impart movement along said path to said pin chain means, and stripper means along which said web passes mounted adjacent said pin chain means and including upper and lower central web guide portions extending between said wheels on opposite sides thereof along planes passing generally through the base of said pins as they are moved between said wheels, and upper and lower end guide portions extending from opposite ends of said upper and lower central guide portions, respectively, toward the upper and lower surfaces of said copyboard, respectively, each said end guide portion being inclined from a corresponding central guide portion toward one of a respective upper and lower surface of said copyboard at a relatively shallow angle for lifting the web from said pins as the web is transported from one of said central guide portions to a respective one of said upper and lower copyboard surfaces and to guide said web onto said pins when the web is transported from one of said upper and lower copyboard surfaces to a respective one of said central guide portions, thereby to avoid tearing of said web about said apertures.

2. Apparatus as claimed in claim 1 wherein the angle of incline of said end guide portions toward respective ones of said upper and lower copyboard surfaces is in the range of 3° to 10°.

3. Apparatus as claimed in claim 2 wherein the diameters of said pins are from 8% to 15% smaller than the diameters of said apertures in said web and as said percentage difference increases, the angle of incline of each said end guide portions decreases within said range.

4. Apparatus as claimed in claim 1 wherein said pin chain means includes extension portions, wherein each said pin is mounted on a respective one of said extension portions and wherein said guide stripper means includes a track portion provided thereon along which said extension portions are transported.

5. Apparatus as claimed in claim 1 further including a pair of shafts extending along said copyboard in a direction transverse the direction of movement of said web, wherein said shafts pass through the wheels of said sprocket devices, wherein two of said sprocket device means are provided for driving said web at opposite sides thereof and wherein said sprocket device means are movable on said shafts toward and away from each other to accommodate webs of varying widths.

6. Apparatus as claimed in claim 1 further including a guide member mounted at the free end of said copyboard about which said web passes, said guide member being mounted for movement toward and away from the free end of said copyboard, switch means mounted adjacent said roller having an armature for actuation thereof, the actuation of said switch means indicating a predetermined slackening of said web, and switch actuator means interposed between said guide and said switch means and engageable with both, said actuator means being operably engaged by said guide means when the latter is moved toward the free end of said copyboard to urge said actuator means into engagement with said armature, thereby actuating said switch means.

* * * * *